N. E. TOUSLEY & C. H. ROPER.

TENNIS SHOE.

APPLICATION FILED JULY 1, 1915.

Reissued Oct. 12, 1915. 13,993.

*Inventors.*
*Nelson E. Tousley.*
*Charles H. Roper.*

*By*
Spear Middleton Donaldson & Spear

UNITED STATES PATENT OFFICE.

NELSON E. TOUSLEY, OF WATERTOWN, AND CHARLES H. ROPER, OF BELMONT, MASSACHUSETTS, ASSIGNORS TO HOOD RUBBER CO., A CORPORATION OF MASSACHUSETTS.

TENNIS-SHOE.

13,993. Specification of Reissued Letters Patent. Reissued Oct. 12, 1915.

Original No. 1,115,875, dated November 3, 1914, Serial No. 774,219. Application for reissue filed July 1, 1915. Serial No. 37,618.

*To all whom it may concern:*

Be it known that we, NELSON E. TOUSLEY, of Watertown, Massachusetts, and CHARLES H. ROPER, of Belmont, Massachusetts, citizens of the United States, and residents of the aforesaid places in the Commonwealth of Massachusetts, have invented certain new and useful Improvements in Tennis-Shoes, of which the following is a specification.

Our invention relates to canvas, or the like fabric, rubber soled shoes, of the type commonly known as tennis shoes, or sneaks, and its object is to provide a shoe of this character equipped with an offset heel, approximating in appearance the heel of an ordinary shoe, so constructed as not to add materially to the weight of the shoe, and possessing a large measure of resiliency.

For a great number of years heelless so-called tennis shoes, or sneaks, characterized by a fabric upper and rubber sole, have been extensively on the market, and for a large number of years it has also been common to equip rubber boots with solid rubber heels and to apply to leather boots and shoes so-called cushion rubber heels, but prior to the advent of the shoe embodying our invention no one had ever marketed, to our knowledge, a tennis shoe, or sneak, equipped with an offset rubber heel. This was probably due to the fact that a tennis shoe, or sneak, equipped with an ordinary rubber heel, would not be a practical, or commercially marketable, article, because, among other reasons, such heel would not possess the requisite resiliency, and would add too great a weight to the shoe. As is well known, rubber compounds are necessarily heavy, and this is particularly true of colored rubber compounds such as white and red, so that, as is well known, the heelless tennis shoes now placed upon the market appear to be unduly heavy, and it is commercially impracticable to add to this weight that of the usual rubber or cushion heel.

Our invention involves the provision of a heel which is particularly light and resilient, so that the shoe equipped therewith is not open to any of the objections stated.

The invention is illustrated in the accompanying drawings, in which—

Figure 1:
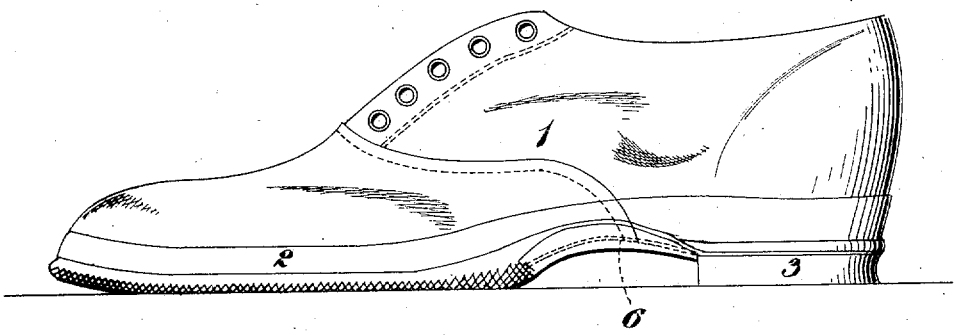
Figure 2:
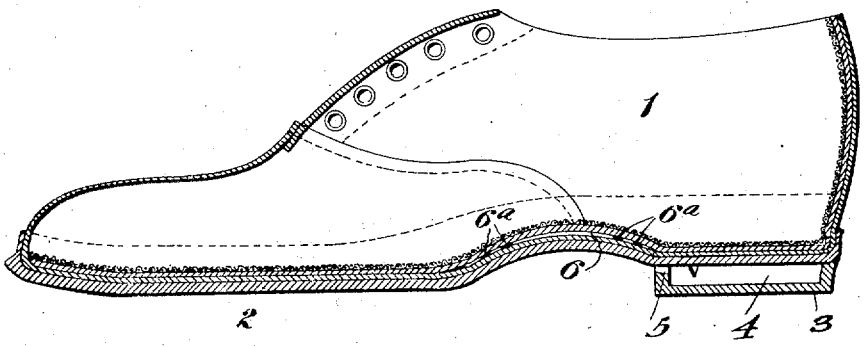
Figure 3:
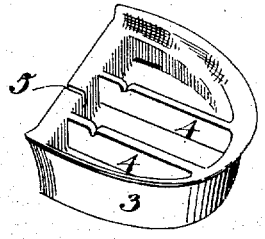

Figure 1 is a side elevation, partly in section, of a tennis shoe embodying our invention; Fig. 2 is a longitudinal sectional view thereof; and Fig. 3 is a view of a detached heel in perspective.

In the drawings embodying our invention, 1 illustrates the usual canvas or fabric upper, and 2 the usual rubber sole comprising a sole portion proper, an instep portion, and a heel portion. An offset heel formed of rubber, or rubber composition, is designated at 3, and comprises comparatively thin bottom and vertical, or side, walls, forming what might be termed a shell, confining a large central space, or chamber, across which a suitable vertically disposed partition extends. In the illustrated embodiment of our invention, two partitions designated 4, 4, are employed, said partitions being comparatively thin, being spaced apart, and extending from the inner face of the front vertical wall to the opposing face of the rear wall. The upper edge of the front wall is shown as provided with a passageway 5 for placing the space between the partitions 4, 4, in communication with the exterior of the shoe when the heel is attached, and similar passageways are shown as provided in the upper edges of the partitions for placing the central chamber of the heel in communication with the side chambers thereof. The heel is attached to the heel portion of the sole by securing thereto, preferably by vulcanization, the upper edges of the partitions and vertical wall aforesaid.

For strengthening the arch of the shoe a metal shank 6 is preferably interposed between the layers of material of which the sole is formed. This shank may be formed with openings $6^a$ at suitable intervals through which the layers of material project, and are joined together in the vulcanization of the sole for aiding in securing the strip firmly in place.

We claim:

1. A tennis shoe, or shoe having a fabric upper and a composition rubber sole, including sole, instep and heel portions, and a composition rubber heel attached to the heel portion and comprising comparatively thin vertical and bottom walls defining a large chamber, and an integral partition extending across the chamber, the upper edges of the vertical wall and partition being attached to the heel portion of the sole.

2. A tennis shoe, or shoe having a fabric upper and a rubber sole comprising sole, instep and heel portions, and a heel attached to the heel portion and comprising a rubber composition shell forming a large chamber and spaced apart partitions integral with the shell extending across the chamber, the upper edges of the partitions and front wall of the shell being provided with passages.

3. A tennis shoe, or like shoe having a fabric upper and composition rubber sole, including sole, instep and heel portions, and a composition rubber heel comprising vertical and bottom walls defining a large chamber, said chamber having a passageway communicating the interior of the heel with the exterior atmosphere, and the bottom wall of the heel having integral therewith and projecting upwardly therefrom a member finding a bearing at its upper edge against the heel portion of the rubber sole, the upper edge of the vertical wall being vulcanized to the heel portion of the rubber sole.

4. A tennis shoe having a fabric upper and a rubber sole vulcanized thereto and including sole, instep and heel portions, and a rubber heel comprising vertical and bottom walls defining a large chamber, the portion of the vertical wall adjacent the instep of the shoe having a passageway in its upper edge, and said edge of the vertical wall on opposite sides of the passageway and throughout its extent being vulcanized to the heel portion of the rubber sole, and a part integral with and projecting upwardly from the bottom wall of the heel between opposite sides of the vertical wall thereof and bearing at its upper edge against the bottom of the heel portion of the rubber sole.

NELSON E. TOUSLEY.
CHARLES H. ROPER.